US007182813B2

United States Patent
Endo et al.

(10) Patent No.: US 7,182,813 B2
(45) Date of Patent: Feb. 27, 2007

(54) PRODUCTION APPARATUS OF MULTILAYER COATING FILM

(75) Inventors: Shuichi Endo, Fujinomiya (JP); Kazuhiko Nojo, Fujinomiya (JP); Tomonari Ogawa, Fujinomiya (JP); Atsushi Kodou, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 277 days.

(21) Appl. No.: 10/341,245

(22) Filed: Jan. 14, 2003

(65) Prior Publication Data

US 2003/0131793 A1 Jul. 17, 2003

(30) Foreign Application Priority Data

Jan. 15, 2002 (JP) .............................. 2002-006152

(51) Int. Cl.
B05C 11/00 (2006.01)
(52) U.S. Cl. .............................. 118/65; 118/64; 118/66; 118/67; 118/68; 118/239
(58) Field of Classification Search ................. 34/548, 34/558, 565, 571
See application file for complete search history.

(56) References Cited

U.S. PATENT DOCUMENTS

| | | | | |
|---|---|---|---|---|
| 2,269,836 A * | 1/1942 | Weiss | 101/416.1 |
| 2,333,220 A * | 11/1943 | Weiss | 101/152 |
| 2,815,307 A * | 12/1957 | Beck | 156/244.24 |
| 3,561,131 A * | 2/1971 | Swartz | 34/73 |
| 3,744,148 A * | 7/1973 | Fletcher et al. | 34/653 |
| 4,074,441 A * | 2/1978 | Helversen et al. | 34/122 |
| 4,410,560 A * | 10/1983 | Kosterka | 427/504 |
| 4,601,260 A * | 7/1986 | Ovshinsky | 118/718 |
| 4,620,997 A * | 11/1986 | Bok | 427/434.3 |
| 4,663,829 A * | 5/1987 | Hartman et al. | 438/62 |
| 4,841,908 A * | 6/1989 | Jacobson et al. | 118/718 |
| 5,079,853 A * | 1/1992 | Kurokawa | 34/60 |
| 5,184,555 A * | 2/1993 | Quadracci et al. | 101/417 |
| 5,332,438 A * | 7/1994 | Ueda et al. | 118/65 |
| 5,496,406 A * | 3/1996 | Beisswanger et al. | 118/643 |
| 5,564,336 A * | 10/1996 | Straubinger et al. | 101/152 |
| 5,567,237 A * | 10/1996 | Kapp-Schwoerer et al. | 118/58 |
| 5,603,168 A * | 2/1997 | McMahon, Jr. | 34/471 |
| 5,832,833 A * | 11/1998 | Burgio | 101/424.1 |
| 5,876,280 A * | 3/1999 | Kitano et al. | 454/187 |
| 6,012,858 A * | 1/2000 | Konishi et al. | 396/611 |
| 6,026,748 A * | 2/2000 | Reed et al. | 101/424.1 |
| 6,178,883 B1 * | 1/2001 | Satoh et al. | 101/220 |
| 6,251,477 B1 * | 6/2001 | Kinnunen et al. | 427/209 |
| 6,398,872 B1 * | 6/2002 | Jojiki | 118/718 |

FOREIGN PATENT DOCUMENTS

JP 03-038182 4/1991

(Continued)

Primary Examiner—Karla Moore
(74) Attorney, Agent, or Firm—Young & Thompson (57) ABSTRACT

The coating construction has flexibility corresponding to the number of layers of multiple coating layers, by which a multilayer coating film can be produced with small film thickness without adherence of dust to a film surface, a drying fault such as unevenness induced by drying-wind on the film surface, or a coating fault such as a level variation and a streak. The multilayer coating film has a coating surface state of high quality with coating thickness deviation of 3% or less. A coating device is constructed in which at least a feed roller, a coater and a dryer are integrally incorporated in a casing, and the coating device is given a function as an independent device, whereby the production apparatus of the multilayer coating film can be constructed by only appropriately placing as many coating devices as the number corresponding to the number of layers of the multiple coating layers formed on a web between a delivery device and a winder.

2 Claims, 7 Drawing Sheets

FOREIGN PATENT DOCUMENTS

| | | |
|---|---|---|
| JP | 06-071210 | 3/1994 |
| JP | 07-284713 | 10/1995 |
| JP | 11-132661 | 5/1999 |
| JP | 2000-102760 | 4/2000 |
| JP | 2000-182949 | 6/2000 |

* cited by examiner

PRODUCTION APPARATUS OF MULTILAYER COATING FILM

BACKGROUND OF THE INVENTION

1. Field of the Invention

The present invention relates to a production apparatus of a multilayer coating film, and particularly to a production apparatus of a multilayer coating film which produces function films such as a wide view angle film and an antireflection film that are used for liquid crystal displays.

2. Description of the Related Art

Recently, various kinds of function films such as a wide view angle film and an antireflection film are widely used for a liquid crystal display. This function film needs to have a small film thickness, no adherence of dust to a coating surface, no coating fault such as a level variation and a streak, and no drying fault such as unevenness on the surface induced by drying-wind, and it further needs to have a high quality coating surface with a coating thickness deviation of 3% or less. The function film comprises multiple coating layers, and the multiple coating layers are made by applying coating solutions with organic solvents a plurality of times to a flexible substrate (hereinafter referred to as a web).

Since the above-described high quality is demanded, the function film with the high quality coating surface cannot be efficiently produced with an ordinary coating device. For example, with a coating device equipped with one coater and a dryer, a web has to be repeatedly passed through the coating device as many times as the number of layers to perform multilayer coating, thus causing the disadvantage that a large variation occurs to the quality, and production efficiency becomes extremely low. Only in terms of quality, it is considered to perform multilayer coating with a spattering device, but the production speed is extremely low with 1 m/min, and the production cost is too high, thus making it difficult to be adopted. There is a multilayer coating apparatus for performing multilayer coating by placing a plurality of sets of coating devices including coaters and dryers in layers, where a web is continuously transferred from the coating device on the upper layer to the coating device in the lower layer to perform multilayer coating. However, the multilayer coating apparatus is limited to three layer coating at the maximum in terms of operability because a delivery device and a winder for the web should not be far from the coater. This apparatus has the disadvantage that a burden of cleaning the coating devices, an operation of passing the web through the devices and the like is too large, and too much loss of time concerning the maintenance is required.

From the viewpoint of efficient multilayer coating, a gravure printing apparatus having three sets to ten sets or more at the maximum of coaters and dryers for one printing apparatus is the most efficient apparatus.

However, in the gravure printing apparatus, it is difficult to build a preferable and flexible coating construction corresponding to the number of layers of the multiple coating layers, and the gravure printing apparatus is insufficient as a multilayer coating film production apparatus for a function film which is demanded to have the above-described high quality in terms of coating, drying, dust prevention and handling. Accordingly, the fact is that there is no production apparatus of the multilayer coating films, especially, no preferable production apparatus of the multilayer coating films which efficiently produces high quality function films such as wide view angle films and antireflection films used for liquid crystal displays.

SUMMARY OF THE INVENTION

The present invention is achieved in view of the above-described circumstances, and has its object to provide a production apparatus of a multilayer coating film preferable for producing various kinds of function films such as a wide view angle film, and an antireflection film, since it is capable of easily building a coating construction with flexibility according to the number of layers of the multiple coating layers, and is capable of producing a multilayer coating film with small film thickness, without adherence of dust to the film surface, a drying fault such as unevenness induced by drying-wind on the film surface, and a coating fault such as a level variation and a streak, and further with a high quality coating surface state with a small coating thickness deviation.

In order to attain the aforementioned object, the present invention is directed to an apparatus for producing a multilayer coating film in which a plurality of coating layers are formed on a web, comprising: a production chamber; a delivery device and a winder of the web which are placed on a floor surface of the production chamber; and a plurality of coating devices which are arranged between the delivery device and the winder of the web, a number of the plurality of coating devices being equal to a number of the plurality of coating layers, each of the plurality of coating devices being constructed to be a unit by integrally incorporating at least a feed roller for transferring the web along a transfer path, a coater provided at the transfer path to form one of the plurality of coating layers on the web, and a dryer for drying the one of the plurality of coating layers inside a casing having an inlet port and an outlet port for the web.

According to the present invention, the coating device is constructed as a unit which makes it easy to provide a plurality of the same devices and combine it with other devices by integrally incorporating at least the feed roller, the coater and the dryer in the casing, and the coating device is given a unit function as an independent device, whereby the production apparatus of the multilayer coating film can be constructed by only suitably placing as many coating devices as the number of layers of the multiple coating layers which are formed on the web between the delivery device and the winder. This makes it possible to build the production apparatus of the multilayer coating film which corresponds to production of the multilayer coating film with any number of layers with one transfer from the delivery of the web to the winding. Accordingly, the production efficiency can be improved, and the production cost can be reduced.

Preferably, the production apparatus of the multilayer coating film further comprises: a dust removing device which is constructed as a unit by integrally incorporating at least a feed roller for transferring the web along a transfer path, and a dust remover provided at the transfer path to remove dust on the web inside a casing having an inlet port and an outlet port for the web; a heat treatment device which is constructed as a unit by integrally incorporating at least a feed roller for transferring the web along a transfer path, and a heat treatment machine provided at the transfer path to thermally treat the web inside a casing having an inlet port and an outlet port for the web; and a surface inspection machine which is constructed as a unit by integrally incorporating at lease a feed roller for transferring the web along a transfer path, and a surface inspection machine provided at the transfer path to inspect a coating surface state of the web, wherein: the dust removing device is placed between the delivery device and the plurality of coating devices; and the heat treatment device and the surface inspection device are placed in order from an upstream side in a transfer direction of the web between the plurality of coating devices and the winder.

According to the present invention, a series of function film production route from delivery of the web to winding is formed. Accordingly, the production apparatus of the multilayer coating film, which produces a function film such as a wide view angle film and an antireflection film, is easily constructed. By providing a UV treatment machine for performing UV treatment for the coating layer after drying at the position after the dryer, the apparatus can suitably correspond to the case in which the cured resin contained in the coating solution is a UV cure resin, and in the case in which it is a thermosetting resin.

Concerning handling of the web which is important to prevent the coating fault such as a level variation and a streak, the feed roller is provided at each device to make tension of the web cut at each device. Hence, even if tension variation occurs to one of the devices, an adverse influence of the tension variation is not given to the devices before and after the device.

Concerning dust prevention, which is important to prevent dust adhering to the film surface, a fan filter unit is provided at an air inlet port formed at a ceiling surface of a casing of each device, an air exhaust port is formed at a bottom surface of the casing, and clean air blown into the casing from the fan filter unit is exhausted from the air exhaust port. As a result, a down flow of clean air can be formed in the casing of each device, and cleanliness inside the casing can be improved. In addition, the fan filter unit is provided at each casing, and therefore cleanliness according to the treatment of each device such as dust removing, coating, surface inspection and the like can be formed inside the casing.

Further, a transfer path in each device is enclosed by a transfer path case, which has an inlet port and an outlet port for the web and has an air introduction port and an air exhaust port, along the transfer path, and clean air is supplied into the air introduction port. As a result, the transfer path in which the web is exposed to dust the most easily can be made a slim transfer path case with a small volumetric capacity, which is corresponding to the transfer path, therefore making it possible to prevent the wind speed of the clean air supplied into the transfer path case from decreasing, and a dead zone where clean air does not flow from occurring. As a result, dust prevention for the web can be performed with a small amount of clean air, and an air amount supplied into the casing can be reduced, and the total air amount can be made small.

As for the dryer important to prevent a drying fault such as unevenness induced by drying-wind on the film surface, the dryer is divided into three or more drying zones along the transfer direction of the web, a supply device which supplies dry air and an exhaust device are provided at each drying zone, and micro-differential pressure gauges to perform static pressure management between the dry zones are provided. As a result, it is possible to individually set the dry air amount and temperature and relative humidity for each drying zone, and a drying condition corresponding to a film surface strength of the coating layer can be selected, thus making it possible to prevent unevenness induced by drying-wind. By performing static pressure management between the drying zones, coming and going of drying air from and to each of the zones can be eliminated as much as possible, the precision of set condition of each zone can be enhanced.

The coater which is important to form a suitable layer for each layer in the multiple coating layer is any one of a direct gravure coater, a reverse coater, a kiss coater, a microgravure coater, a bar coater, and an extrusion coater, and the coater is provided to be replaceable. As a result, even when the coating condition of each layer constructing a multilayer, for example, kinds of solution, coating amount, coating method (kind of coater) differ, the apparatus can easily correspond to it.

Further, the coater inside the coating device is placed to be located on a floor surface of the casing of the coating device or near the floor surface. As a result, since all of the delivery device, coater, and the winder can be arranged on the same floor, operability in attaching required a raw roll of the web to the delivery machine, winding handling of the multilayer coating film being the produced product to the winder, replacing operation of the coater, transportation of the coating solution and the like according to the types of the multilayer coating film to be produced can be extremely improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 3(*a*), 3(*b*) and 3(*c*) are explanatory views explaining switching of coaters;

DETAILED DESCRIPTION OF THE PREFERRED EMBODIMENTS

A preferred embodiment of a production apparatus of a multilayer coating film according to the present invention will be explained in detail below with reference to the attached drawings.

Figure 1:
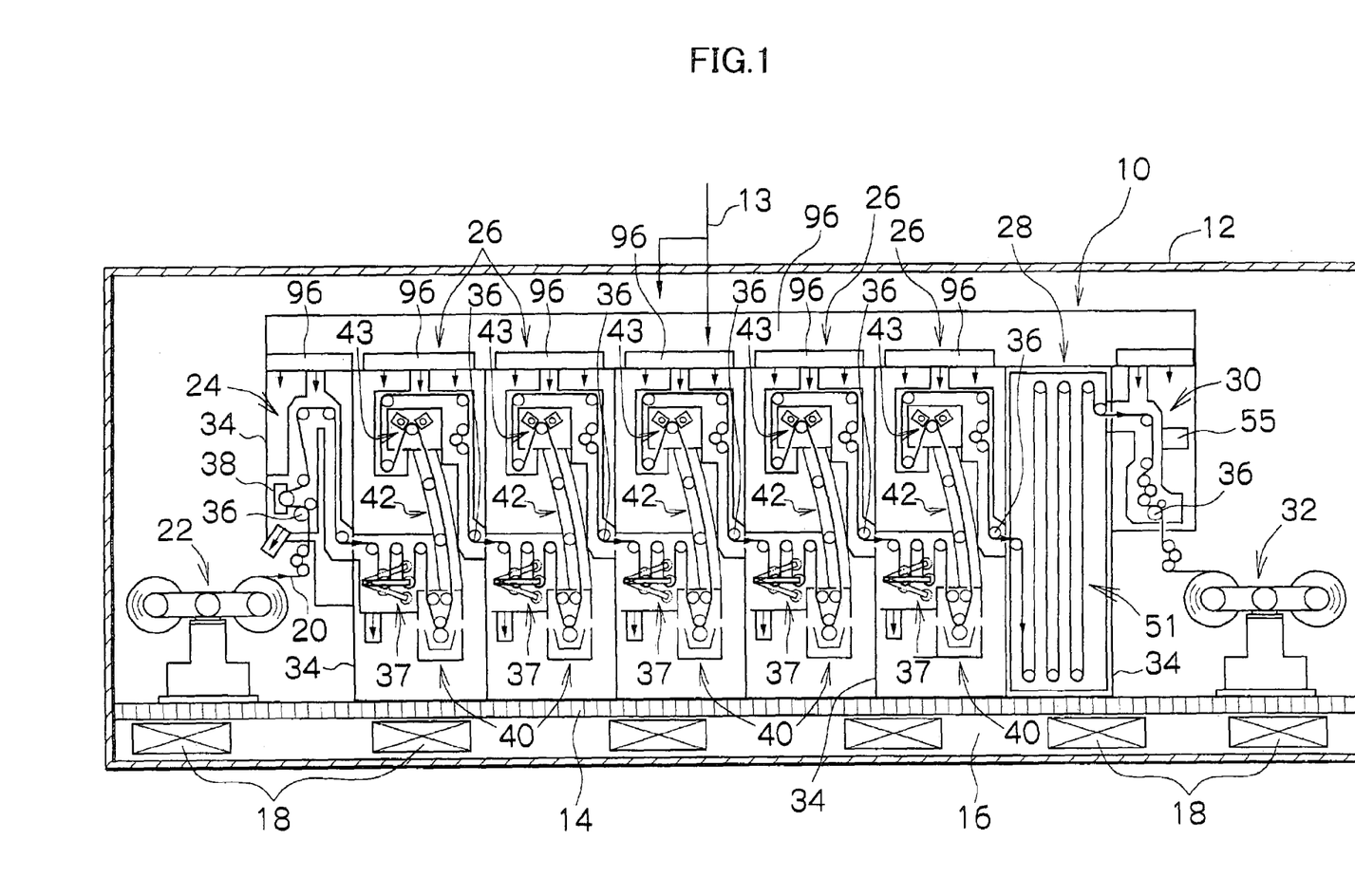
FIG. 1 is an entire block diagram of a production apparatus of a multilayer coating film of the present invention.

FIG. 1 is a block diagram of an entire production apparatus of a multilayer coating film according to the present invention and is an example of the production apparatus which produces function films such as a wide view angle film and an antireflection film. The apparatus in FIG. 1 is constructed to produce a multilayer coating film of five layers.

As shown in FIG. 1, the production apparatus 10 is entirely housed in a production chamber 12, and clean conditioned air is supplied into the production chamber 12 from an air conditioner (not shown) through an air duct 13. A floor surface 14 of the production chamber 12 is formed by a grating floor, and an underfloor space 16 is formed under the floor surface 14. Consequently, the conditioned air supplied into the production chamber 12 flows down inside the production chamber 12 to the underfloor space 16 from the floor surface 14 and is discharged through an exhaust duct 18.

Inside the production chamber 12, a delivery device 22 for letting out a web 20 wound like a roll, a dust removing device 24 which removes dust on the web 20 and is constructed as a unit, five coating devices 26 which form coating layers on the web 20 in order and are constructed as units, a heat treatment device 28 which thermally treats the coating layers formed by coating on the web 20 and is constructed as a unit, a surface inspection device 30 which checks whether there are a coating fault and a drying fault such as level irregularity, streak, and unevenness induced by drying-wind on a surface of the coating layers and is constructed as a unit, and a winder 32 which rolls a product of the produced multilayer coating film around on a core, are laterally placed in line from the left end side to the right end side in FIG. 1. This constructs a route of a series of function film production of: delivery of the web 20→feeding into the first device→(dust removal)→(the first coating→drying→UV treatment)→intermediate feeding between the devices→(the second coating→drying→UV treatment)→intermediate feeding between the devices→ . . . →(the fifth coating→drying→UV treatment)→heat treatment→surface inspection→feeding out of the device→winding. In FIG. 1, five of the coating devices 26 are shown, but the coating devices 26 as many as the number of layers of the multiple coating layers to be formed are placed.

The dust removing device 24 is constructed by integrally including at least a feed roller 36 for transferring the web 20 along a transfer path and a dust remover 38 provided at the transfer path in a casing 34 having an inlet port and an outlet port of the web 20. The dust remover 38 is not especially limited, if only it can effectively remove dust from the web 20, and an air dust removing method and an ultrasonic wave cleaner can be suitably used. As the feed roller 36, a nip method of transferring the web 20 by nipping it with two rollers, or a suction method of transferring the web 20 by sucking it to a roller can be suitably used. The dust removing device 24 arrests dust of the web 20 at a time just before the first coating is applied, and as to dust prevention after the dust removing device 24, a static electricity eliminator (not shown) is placed as necessary to prevent dust from adhering to the web 20, or dust prevention is performed by cleaning air blowing into the production chamber 12 and a transfer path case 98 (see FIGS. 7 and 8) covering the transfer path, which will be described later.

Figure 2:
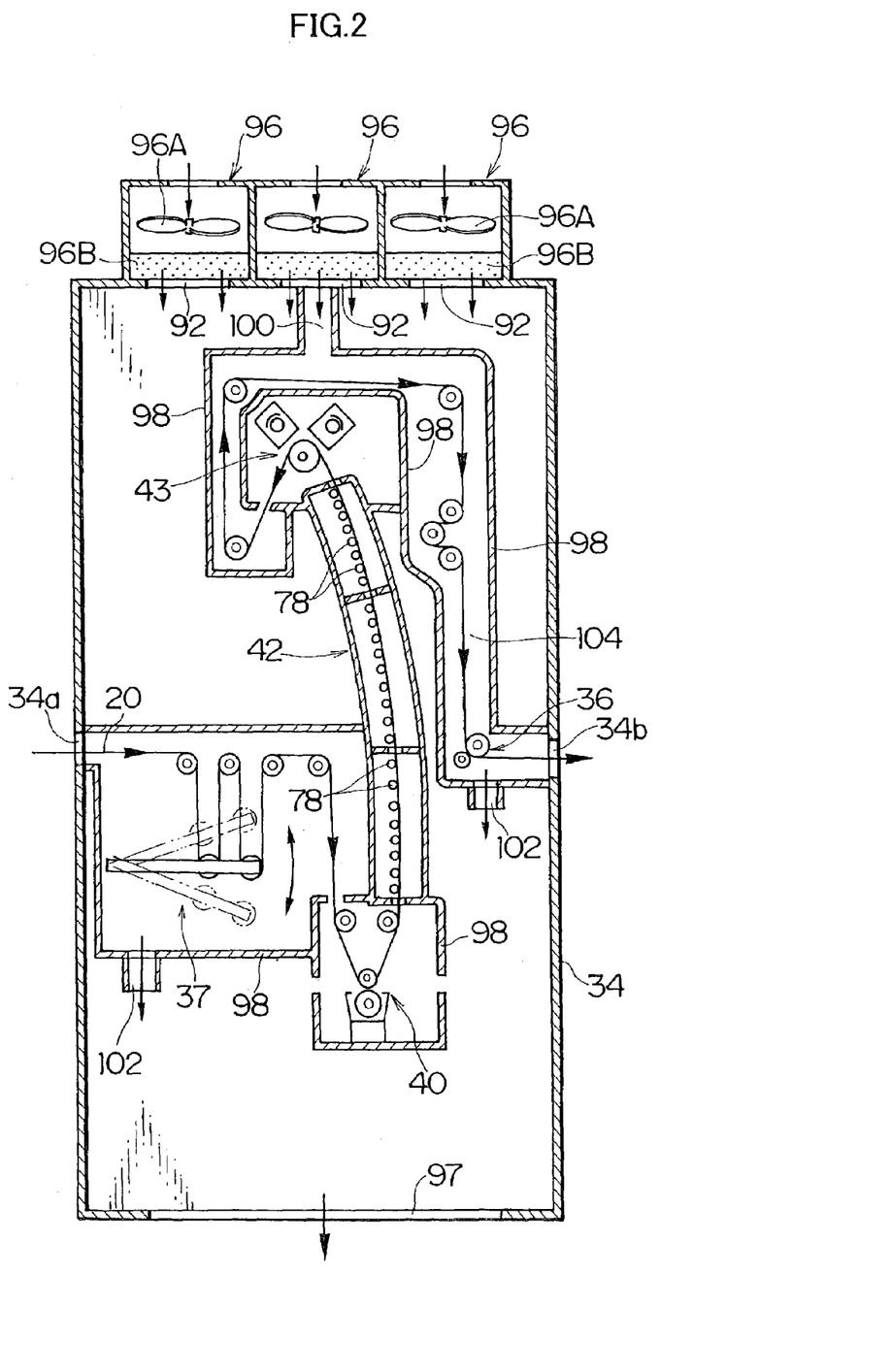
FIG. 2 is a block diagram of a coating device constructed as a unit.

As shown in FIGS. 1 and 2, the coating device 26 is constructed by integrally including at least a feed roller 36 for transferring the web 20 along the transfer path, a dancer roller 37 which is provided at the transfer path and eliminates a tension variation of the web 20, a coater 40 which forms one coating layer on the web 20, and a dryer 42 which dries the coating layer, in the casing 34 having an inlet port 34a and an outlet port 34b of the web 20. In this case, if a UV treatment device 43, which performs UV (ultraviolet ray) treatment for the coating layer after drying, is provided, the apparatus can correspond to the case in which a cured resin contained in the coating solution is a UV cured resin and the case in which it is a thermosetting resin as necessary.

Figure 3A:
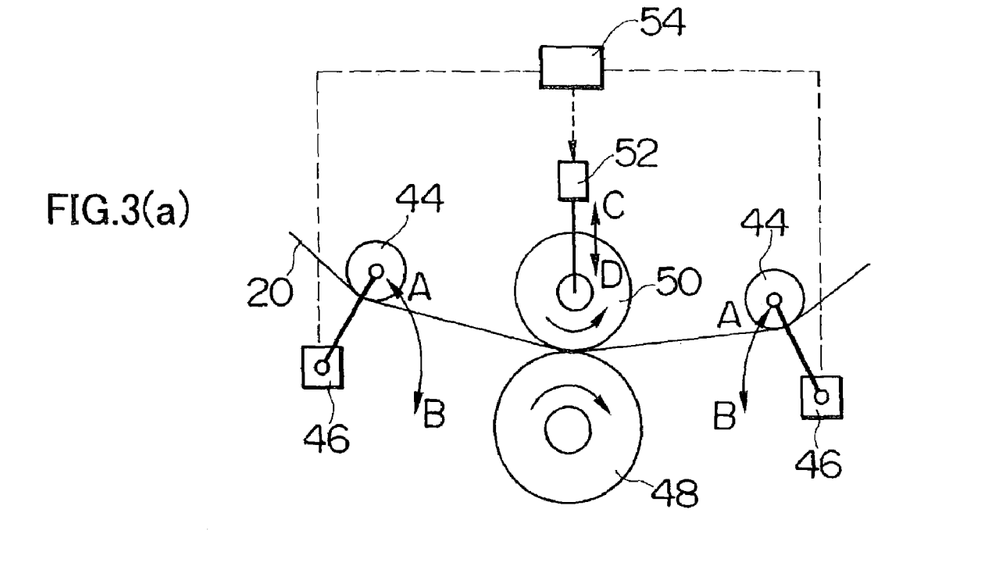
Figure 3B:
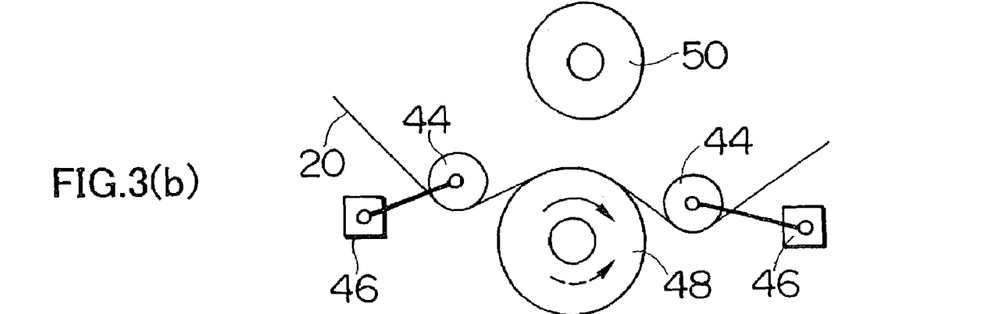
Figure 3C:
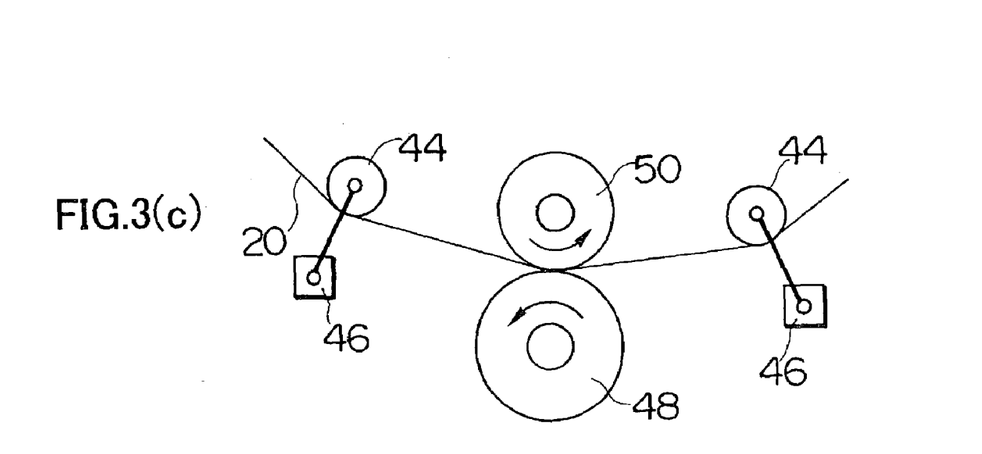

The coater 40 is constructed to be switchable to any one of a direct gravure coater, a reverse coater, a kiss coater, a micro-gravure coater, a bar coater, and an extrusion coater so that the kind of the coater 40 can be changed according to a coating method and coating conditions of each layer of the multiple coating layers, for example, the kind of a coating solution, coating amount, tension of the web 20, drying temperature, air flow and so on. Of the above coaters, as to three types of coaters which are the direct gravure coater, the reverse coater, and the kiss coater, pass rollers 44 placed at an upstream side and a downstream side of the coater are made swingable in the A-B direction in FIG. 3(a) around swing devices 46, and an impression roller 50 is constructed to be movable in the C-D direction in FIG. 3(a) with a moving device 52 so that an printing roller 48 rotatable forwardly and reversely and the impression roller 50 can move close to or away from each other as shown in FIG. 3(a). The swing devices 46 and the moving device 52 are made to be operated with an operating panel 54. According to this structure, it is preferable to perform switching of the direct gravure coater in FIG. 3(a), the kiss coater in FIG. 3(b) and the reverse coater in FIG. 3(c) by one-touch control on the operating panel 54. As for three types of coaters which are the micro-gravure coater, the bar coater, and the extrusion coater, it is preferable to unitize a set of coater device and make it possible to attach and detach the entire device to and from the casing 34.

Since coating of high quality with coating thickness deviation being 3% or less without coating fault such as level variations and streak is demanded in production of the function film such as a wide view angle film and antireflection film, it is preferable to construct the coating device 26 as follows.

In the case of the coater 40 using the printing roller 48 and the impression roller 50, the rotational speed variations of the printing roller 48 and the impression roller 50 are made 0.2% or less. For this purpose, it is preferable to use an AC vector inverter motor, a planetary roller reducer, a form flexible joint, and high precision bearing in a driving system. As the feed roller 36, a nip type and a suction type can be suitably used as the dust removing device 24.

In the case of any kind of coater 40, it is preferable to make the variation ratio of the transferring speed of the web 20 to be 0.5% or less. For this purpose, it is preferable to adopt a sectional drive method, and it is suitable to provide the feed roller 36 at an end of a downstream of the transfer path of the web 20 at each coating device 26. Consequently, the feed rollers 36 are individually driven to make it possible to transfer the web 20 to the coating devices 26, and the tension in the transfer direction of the web 20 is cut for each coating device 26, therefore making it possible to prevent a tension variation occurring to one of the coating device 26 from being consecutively transmitted to the other coating devices 26. In the driving system for the feed rollers 36, it is preferable to use an AC vector inverter motor, a planetary roller reducer, a form flexible joint and a high precision bearing.

Figure 4:
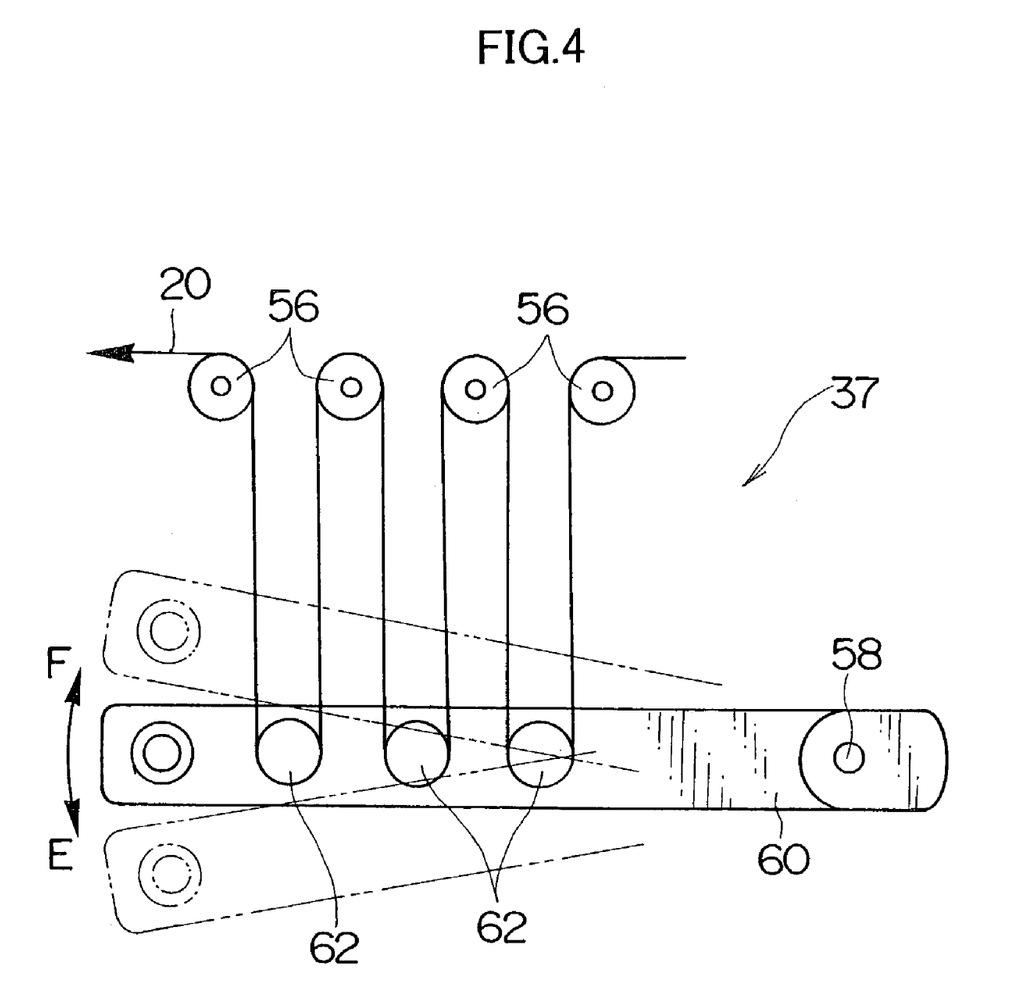
FIG. 4 is an explanatory view explaining a dancer roller.

Further, it is suitable to place the dancer roller 37 at an upstream side of the coater 40. This not only makes it possible to eliminate the transfer speed variation and the tension variation of the web 20 in each of the coating devices 26, but also makes it possible to prevent the transfer speed variation and the tension variation of the web 20 in the coating device 26 at the upstream side from influencing on the coating device 26 at the downstream side. As the dancer roller 37, the one with the construction as shown in FIG. 4 can be suitably used. In the dancer roller 37, a swing plate 60, which swings in the E-F direction around a shaft 58, is placed under a plurality of pass rollers 56 fixedly placed, and a plurality of moving rollers 62 are rotatably supported in a longitudinal direction of the swing plate 60. The web 20 is alternately passed around the pass rollers 56 and the moving rollers 62. Consequently, if there is the transfer speed variation and/or the tension variation in the web 20, the swing plate 60 swings in the E-F direction, and the variation is thereby eliminated.

Harmony of the transfer speed and the tension of the web 20 between the plurality of coating devices 26 may be attained by controlling the feed rollers 36 and the dancer rollers 37 as follows. Namely, the feed roller 36 of the coating device 26 at the uppermost stream position out of the plurality of coating devices 26 placed between the delivery device 22 and the winder 32 is made a reference roller to control the transfer speed of the web 20, and the feed rollers 36 of the second coating device 26 and the following coating devices 36 are controlled with a speed signal derived from the reference roller as the reference. The dancer roller 37 of the coating device 26 at the uppermost stream position out of the plurality of coating devices 26 is made as the reference dancer roller, and the dancer rollers 37 of the second coating device 26 and the following coating devices 26 are controlled with a positional signal showing a swing amount of the reference dancer roller 37 as the reference. In this case, as the dancer roller 37, the large-capacity dancer roller 37 is preferable. This is to control a long-period variation that has a large influence on the coating fault, though ignoring a short-period variation of the tension variation to some extent.

Figure 5:
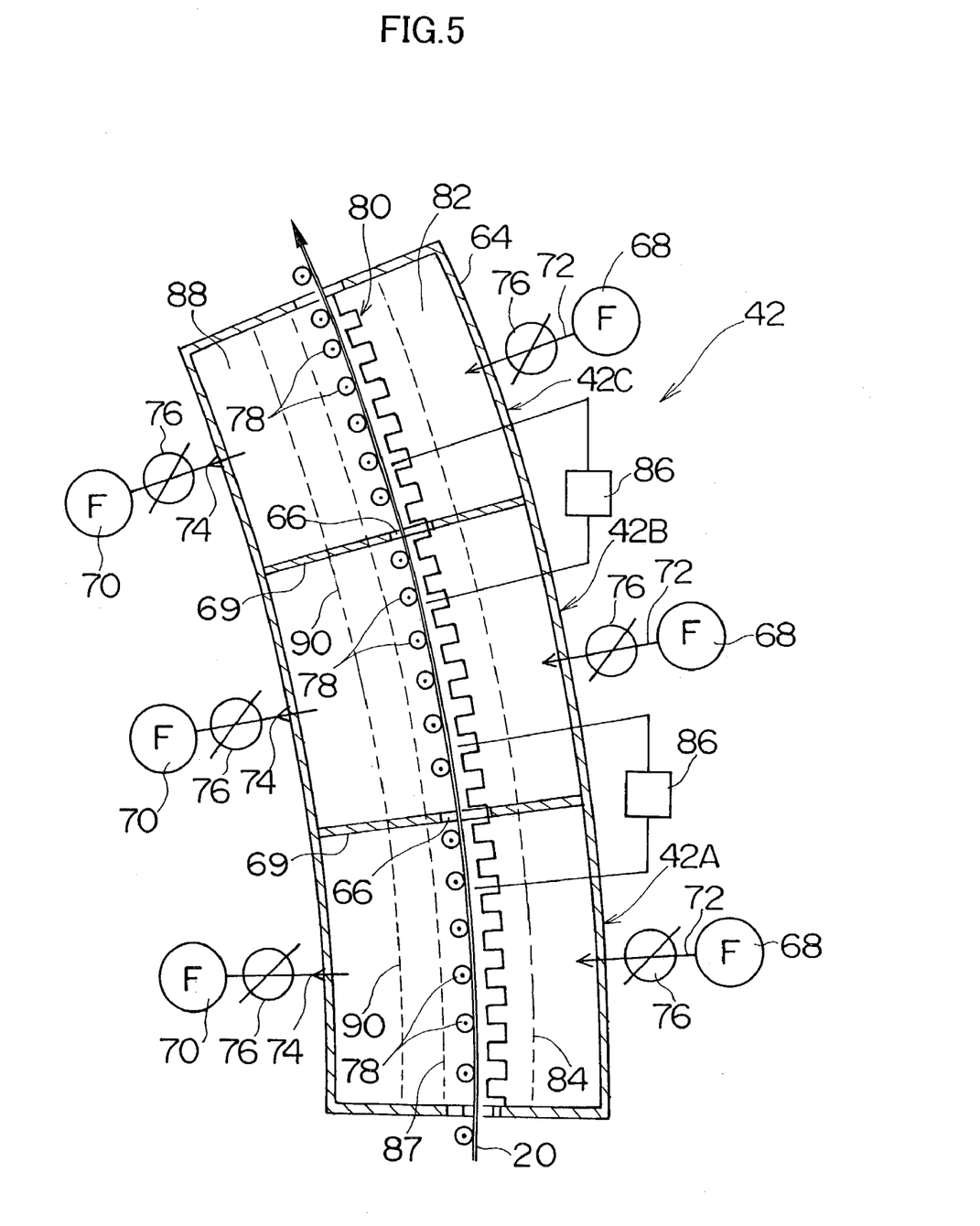
FIG. 5 is a side sectional view explaining a dryer.

As shown in FIG. 5, in the dryer 42, a device casing 64 is formed into an arch shape, and is divided into three dry zones 42A, 42B and 42C by partition plates 69 having passage ports 66 for the web 20, and an air supply fan 68 for supplying dry air and an exhaust fan 70 for exhausting air are provided at each of the dry zones 42A, 42B and 42C. Each of an air supply duct 72 and an exhaust duct 74, which are provided with the air supply fan 68 and the exhaust fan 70, is provided with a damper device 76, and by controlling the damper opening degree, supply and exhaust air amounts in each of the dry zones 42A, 42B and 42C are individually controlled. As a result, it is possible to control dry temperature and relative humidity, and air quantity independently for each of the dry zones 42A, 42B and 42C, and dry conditions corresponding to the film surface strength of the coating layer formed on the web 20 can be set. Accordingly, the drying fault such as unevenness induced by drying-wind on the coating surface during drying can be prevented.

In the device casing 64, a number of backup rollers 78 are arranged on an arch line along the transfer path of the web 20, and an arch-shaped nozzle plate 80 is placed at an opposite side of the backup rollers 78 across the web 20. An air supply chamber 82 is formed in a space enclosed by the nozzle plate 80 and the device casing 64, and an arch-shaped supply side current plate 84 which is parallel with the nozzle plate 80 is placed in the air supply chamber 82. Further, an air suction chamber 88 is formed in a space enclosed by an arch-shaped suction plate 87 and the device casing 64 at an opposite side of the air supply chamber 82 across the backup rollers 78, and an arch-shaped suction side current plate 90 is placed inside the air suction chamber 88. A number of holes are formed in a punched metal form in the suction plate 87 and the current plates 84 and 90, and dry air supplied into the device casing 64 by the supply air fan 68 is formed into a laminar flow from the air supply chamber 82 to the air suction chamber 88 by the action of the current plates 84 and 90 at the supply side and the suction side. As a result, disturbance of dry air at the coating layer surface can be prevented, and therefore drying fault such as unevenness induced by drying-wind can be further reduced.

Figure 6:
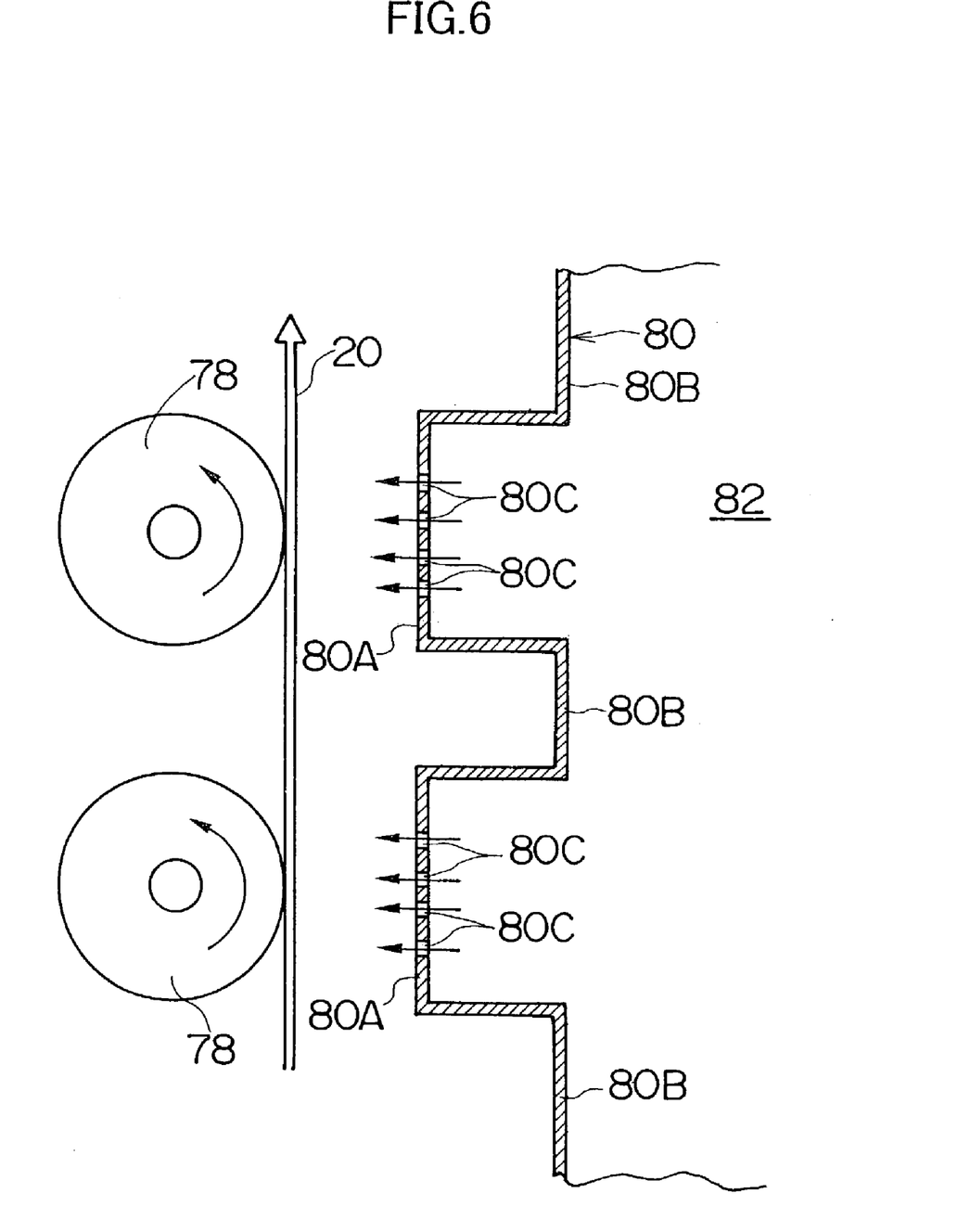
FIG. 6 is an explanatory view explaining relationship between a nozzle plate and a backup roller of the dryer.

As shown in FIG. 6, the nozzle plate 80 is formed into a continuous corrugated plate form, which is parallel with the backup rollers 78 (in a direction perpendicular to the sheet of FIG. 6) and has alternating raised portions 80A and recessed portions 80B, and nozzle holes 80C are provided in the raised portions 80A. As known from FIG. 6, the backup rollers 78 and the raised portions 80A are constructed to be placed to face each other, so that dry air, which is blown from the nozzle holes 80C, blows against the backup rollers 78. As a result, the web 20 transferred on the backup rollers 78 is pressed against the backup rollers 78 to be gripped securely, and therefore flapping of the web 20 and occurrence of a scratch on the web 20 by a slip can be prevented.

Further, as shown in FIG. 5, micro-differential pressure gauges 86 for managing static pressure differences are provided between the respective adjacent dry zones 42A, 42B, and 42C, and according to measurement values of the micro-differential pressure gauges 86, air supply and exhaust amount is managed so that the static pressure of each of the dry zones 42A, 42B and 42C becomes the same. Consequently, air of the adjacent dry zones 42A, 42B and 42C does not go back and forth via the passage ports 66 for the web 20, which are formed at the partition plates 69, and therefore drying condition for each of the dry zones 42A, 42B and 42C can be set with high precision.

The heat treatment device 28 is constructed by integrally incorporating at least a heat treatment machine 51 for thermally treating the coating layer inside the casing 34 having an inlet port and an outlet port for the web 20 as shown in FIG. 1. As the heat treatment machine 51, for example, a machine with a method of heating the web 20 to be transferred by supplying hot air into the casing 34 can be suitably used as shown in FIG. 1, but the heat treatment machine 51 is not limited to this. In FIG. 1, the feed roller 36 is not provided in the heat treatment device 28, but it may be provided therein.

The surface inspection device 30 is constructed by integrally incorporating at least the feed roller 36 for transferring the web 20 along the transfer path, and a surface inspection machine 55, which is provided at the transfer path and inspects the state of the coating surface of the coating layer, inside the casing 34 having an inlet port and an outlet port for the web 20 as shown in FIG. 1. Since the surface inspection device 30 is constructed as the device having an independent function, an optional number of them can be placed at an optional position of the production apparatus 10, and by placing it in front of the winder 32 as shown in FIG. 1 and carrying out the following usage, the surface inspection of each layer of the multiple coating layers can be performed with one surface inspection device 30. Namely, at the time of starting operation of the production apparatus 10, or when a defect in coating and the like is found in an end product, coating and surface inspection are performed for each layer from the coater 40 at the upstream side, then if this is acceptable, coating and surface inspection are performed for the following coaters 40 in order, and the final coating and surface inspection are performed. As a result, it can be determined which layer has the coating defect. During normal operations, the surface inspection device 30 is used for surface inspection of the end products.

Next, a dust prevention measure on the transfer path of the above-described devices 24 to 30 is explained with the example of the coating device 26 in FIG. 2.

As shown in FIG. 2, air inlets 92 are formed in a ceiling surface of the casing 34, and a plurality of fan filter units 96 are provided in a space 94 in the ceiling (see FIG. 1) of the casing 34, which corresponds to the air inlets 92. The conditioned air is supplied to the space 94 in the ceiling from the air conditioner (not shown). The fan filter unit 96 is a unit in which a fan 96A and a HEPA filter 96B are integrally incorporated, and the number of the fan filter units 96 provided can be easily increased or decreased according to cleanliness demanded according to the kind of the unit. Meanwhile, an air exhaust port 97 is formed in the bottom surface of the casing 34, and the casing 34 is placed on the floor surface 14 formed by the grating floor, whereby the casing 34 is allowed to communicate with the underfloor space 16 (see FIG. 1). As a result, the conditioned air which is supplied to the space 94 in the ceiling is further purified in the HEPA filter 96B and blown into the casing 34, flows down inside the casing 34, then flows into the underfloor space 16 from the floor surface 14, and is exhausted through the exhaust duct 18.

The transfer path from the inlet port 34a to the outlet port 34b of the casing 34 is enclosed by a box-shaped or tube-shaped transfer path case 98 along the transfer path. An air introduction port 100 and air exhaust ports 102 are formed at the transfer path case 98, and the air introduction port 100 is connected to one of the fan filter units 96. The parts enclosed by the transfer path case 98 are an area around the dancer roller 37, an area around the coater 40, an area around the UV treatment machine 43, and an area around a passage 104 from the UV treatment machine 43 to the outlet port 34b.

Figure 7:
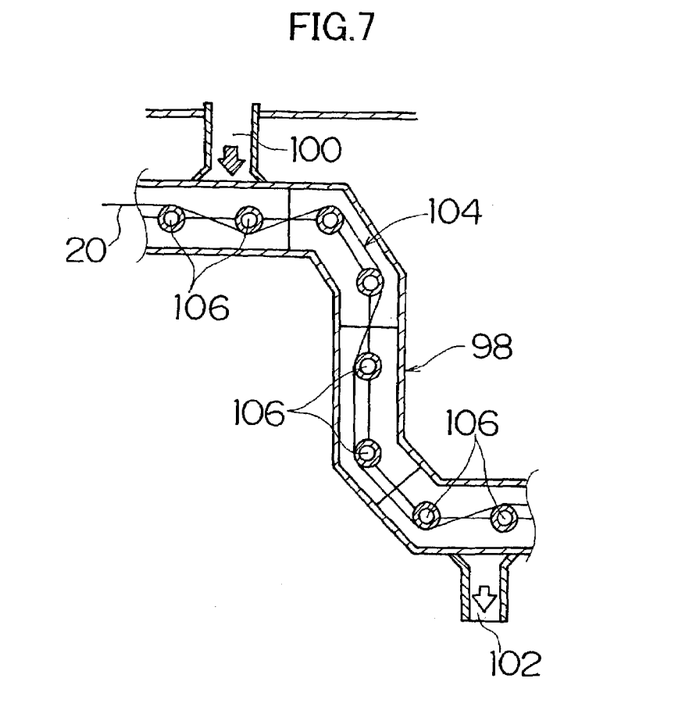
FIG. 7 is a sectional side view explaining a dust prevention measure for a transfer path.
Figure 8:
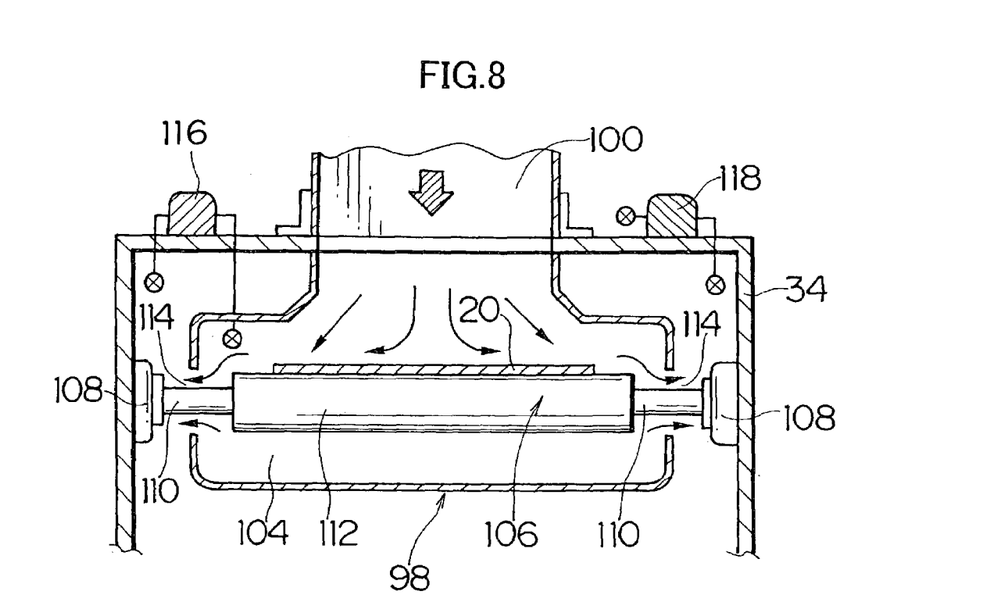
FIG. 8 is a sectional front view explaining the dust prevention measure for the transfer path.

FIGS. 7 and 8 show the passage 104 part from the UV treatment machine 43 to the outlet port 34b in detail, wherein a number of pass rollers 106 which transfer the web 20 are arranged in a vertical direction, and the tube-shaped transfer path case 98 is provided along this passage 104. As a result, as known from FIG. 8, the passage 104 is formed to be a doubly enclosed structure by the casing 34 and the transfer path case 98. As shown in FIG. 8, the relationship between the casing 34 and the transfer path case 98, and a pass roller 106 is constructed so that roller journal portions 110 supported by bearings 108 fixed to the inner wall surface of the casing 34 are placed outside the transfer path case 98, and only a roller shell portion 112 of the pass roller 106 and the web 20 are enclosed by the transfer path case 98. In this manner, out of the pass roller 106, only the roller shell portion 112 with which the web 20 is in contact is enclosed by the transfer path case 98, whereby the transfer path case 98 can be made slim and small in volumetric capacity corresponding to the passage 104, and therefore a wind speed of clean air supplied into the transfer path case 98 can be maintained and dead zone where clean air does not flow can be prevented from occurring. The bearings 108 and the roller journal parts 110 where dust easily occurs and dust easily settles are located outside the transfer path case 98, whereby cleanliness inside the transfer path case 98 can be kept further higher. In such construction, gaps 114 not to hinder rotation are formed between the transfer path case 98 and the roller journal parts 110. However, a flow of air from an inside of the transfer path case 98 to an outside thereof always occurs through the gaps 114, and therefore dust which occurs at the bearings 108 and the roller journal parts 110 do not enter the transfer path case 98. Further, as shown in FIG. 8, a plurality of micro-differential pressure gauges 116 for detecting pressure difference between the inside and the outside of the transfer path case 98 are provided inside and outside the transfer path case 98, and according to the detection result of the micro-differential pressure gauge 116, the inside pressure of the transfer path case 98 is kept higher than the outside pressure, whereby it is made further possible that air in the casing 34 side does not enter the transfer path case 98. Further, it is more preferable to provide a micro-differential gauge 118 for detecting the pressure difference between an inside and an outside of the casing 34 to keep the inside pressure of the casing 34 higher than the outside pressure.

The above-described dust prevention measure of the transfer path is the explanation of the transfer path of the passage 104 part from the UV treatment machine 43 to the outlet port 34b, and it is suitable to construct the dancer roller 37, the coater 40 and the UV treatment machine 43 so that the drive parts where dust easily occurs are placed outside the transfer path case 98 and perform pressure management with the micro-differential pressure gauges 116 and 118.

As explained thus far, according to the production apparatus of the multilayer coating film of the present invention, coating construction with flexibility according to the number of layers of the multiple coating layers can be easily constructed, and the multilayer coating film with small film thickness, without dust attaching to the film surface, dry fault such as unevenness induced by drying-wind on the film surface and coating fault such as level variation and a streak, and further with coating surface state with high quality with coating thickness deviation of 3% or less can be produced. Accordingly, the present invention is preferable to produce various kinds of function films such as wide view angle films and antireflection films.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An apparatus for forming a desired number of multiple coating layers on a belt-like substrate, the apparatus comprising:
   a feeding device which continuously feeds the belt-like substrate;
   a coating/drying device in which following devices (i) to (iii) are configured as a single unit;
   (i) a transferring device which introduces the belt-like substrate fed out from the feeding device into a casing and leads the substrate out of the casing after continuously transferring the substrate along a transfer path in the casing;
   (ii) a coating device which is provided in the casing and forms a single coating layer by applying a coating solution onto the belt-like substrate being continuously transferred;
   (iii) a drying device which is provided in the casing and dries the single coating layer formed on the belt-like substrate being continuously transferred;
   a winding device which winds the belt-like substrate led out of the casing,
   wherein a desired number of the coating/drying devices are serially arranged between the feeding device and the winding device,
   a supply port of a clean air is formed on a ceiling surface of the casing, and
   an exhausting port is formed on a bottom surface of the casing;
   wherein in the transfer path, a box-shaped or cylindrical-shaped transfer path case through which the belt-like substrate is transferred is provided except for the drying device;
   an air inlet port from which a part of the clean air blown out from the supply port is introduced and an air exhausting port from which the introduced clean air is exhausted are formed in the transfer path case;

a pass roller which transfers the belt-like substrate is arranged along the transfer path; and the transfer path case surrounds only a roller shell portion of the pass roller.

2. The apparatus for forming multiple coating layers according to claim 1, further comprising a pressure control device which keeps a pressure in the transfer path case higher than an outside pressure.

* * * * *